Nov. 6, 1928.

P. P. GROSSO 1,690,292

CAMERA

Filed June 11, 1926

INVENTOR
P. P. GROSSO
BY Munn & Co.
ATTORNEYS

Patented Nov. 6, 1928.

1,690,292

UNITED STATES PATENT OFFICE.

PATRICK P. GROSSO, OF CHICAGO, ILLINOIS.

CAMERA.

Application filed June 11, 1926. Serial No. 115,266.

My invention relates to improvements in cameras, and it consists in the combinations, constructions, and arrangements herein described and claimed.

An object of my invention is to provide a camera which has the general appearance of an automatic pistol, and which operates automatically by actuating a trigger.

A further object of my invention is to provide a device of the type described which moves the film before the shutter is automatically actuated.

A further object of my invention is to provide a device of the type described by means of which a great number of exposures may be made from one roll of film.

A further object of my invention is to provide a device of the type described by means of which a plurality of exposures may be made in rapid succession.

Other objects and advantages will appear in the following specification, and the novel features of the invention will be particularly pointed out in the appended claims.

My invention is illustrated in the accompanying drawings, forming part of this application, in which Figure 1 is a rear elevation of the device, Figure 2 is a section along the line 2—2 of Figure 1, Figure 3 is a view of the shutter taken substantially along the line 3—3 of Figure 2.

Figure 2:
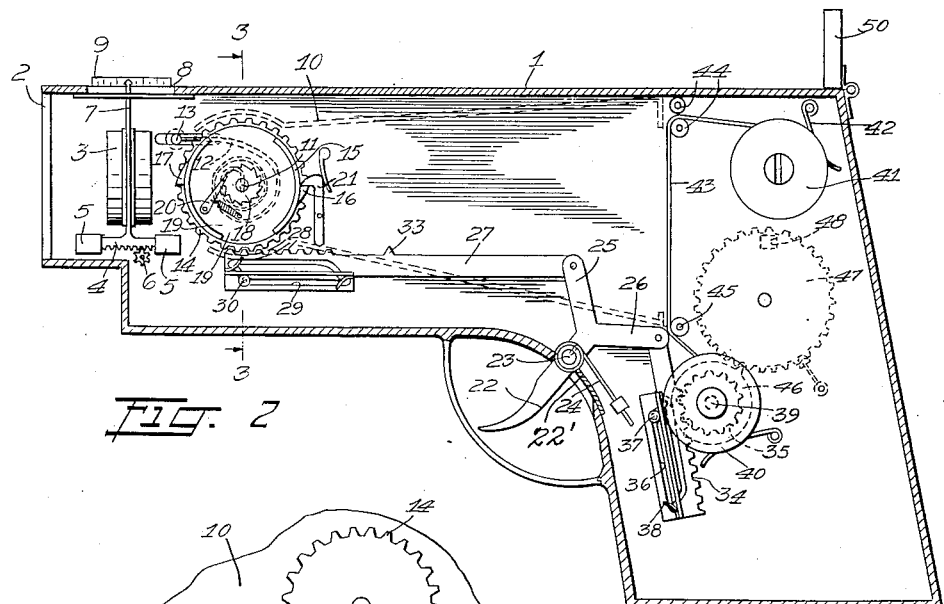
Figure 5:
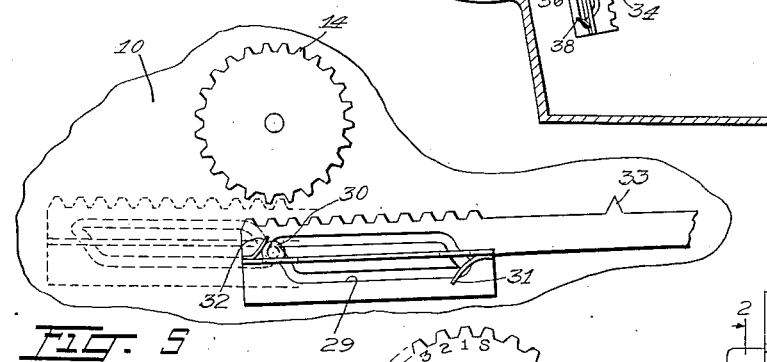
Figure 5 is an enlarged view of a portion of the device.
Figure 6:
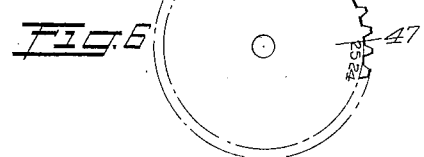
Figure 6 is a plan view of a part of the indicating mechanism.
Figure 3:
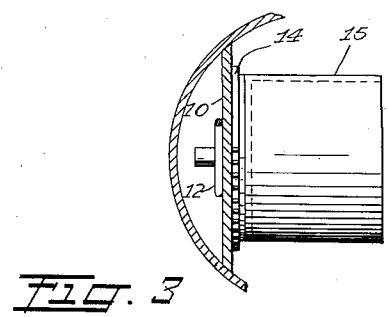
Figure 4:
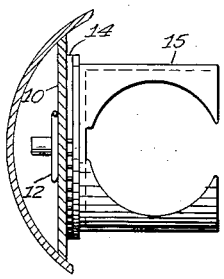
Figure 4 is a view of the shutter in open position.
Figure 7:
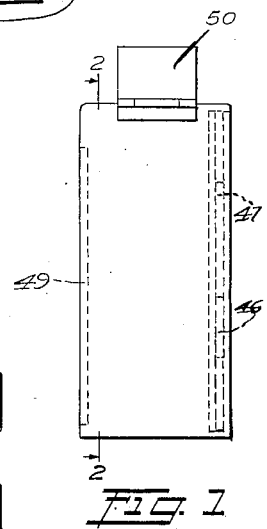

In carrying out my invention, I provide a substantially pistol-shaped casing 1 having an opening 2 in the forward end thereof. A lens 3 is disposed in the casing 1 and in alignment with the opening 2. The lens 3 is provided with a rack 4 which is slidably disposed in sleeves 5 and in engagement with a hand-operated gear 6. The lens 3 is also provided with an indicating hand 7, the end of which is disposed through on opening 8 in the casing 1 and adjacent an indicating bar 9.

A plate 10 is disposed vertically within the casing 1. A shaft 11 is rotatably disposed within the casing 1 and the plate 10. A spring 12 is provided having one end rigidly secured to the shaft 11, and the other end secured to an adjusting screw 13.

A sprocket wheel 14 is rigidly mounted upon the shaft 11. A cylindrical shutter 15 is loosely mounted upon the shaft 11 and provided with integral cams 16 and 17. A ratchet 18 is rigidly mounted upon the shaft 11 within the shutter 15 adjacent the end wall 19 thereof. A spring-pressed pawl 20 is secured to the end wall 19, and is in engagement with the ratchet 18. A spring pressed catch 21 is pivotally mounted upon the plate 10, and is adapted to engage with the cams 16 and 17.

A trigger 22 is rigidly mounted upon a pin 23 which is pivotally disposed within the casing 1. A spring 24 is provided having one end rigidly secured to the pin 23, and the other end secured to the plate 10. The trigger 22 is provided with a fork-shaped end having projections 25 and 26. A lever 27 is pivotally mounted at one end upon the projection 25. The free end of the lever 27 is provided with teeth 28 which are adapted to mesh with the sprocket wheel 14. The lever 27 is provided with a continuous groove 29. A pin 30 having an enlarged head is rigidly mounted upon the plate 10, and is adapted to ride in the groove 29. Leaf springs 31 and 32 are provided for a purpose hereinafter described. A lug 33 is integral with the lever 27 and is adapted to engage with the catch 21.

The projection 26 is provided with a rack 34 which is pivotally mounted thereupon, and adapted to mesh with a gear 35. The rack 34 is provided with a continuous groove 36. A pin 37 having an enlarged head portion is rigidly mounted upon the plate 10, and is disposed in the groove 36. Springs 38 and 38' are provided.

The gear 35 is rigidly mounted upon a shaft 39 which is rotatably disposed in the casing 1 in the plate 10. A film-receiving roller 40 is rigidly mounted upon the shaft 39. A film-containing roller 41 is rotatably disposed within the casing, and is provided with a spring 42 which tends to hold the roller against rotation. A film 43 is passed between rollers 44 and over a roller 45, and secured to the roller 40.

A one-toothed gear 46 is rigidly mounted upon the shaft 39 adjacent the other side of the plate 10, see Figures 1 and 2. An indicating gear 47 having thirty-one teeth is pivotally mounted upon the plate 10, and is in mesh with the tooth upon the gear 46. The gear 47 is provided with numbers from 1 to 25 inclusive, which are positioned adjacent the teeth of the gear 47. Five teeth of the gear 47 are without numbers, and one tooth is provided with a letter S. An opening 48 is cut in the casing 1, see Figure 2. A cover 49 and a finder 50 are provided.

From the foregoing description of the various parts of the device, the operation thereof may be readily understood. When the film 43 is inserted in place and the cover 49 placed upon the casing, the trigger 22, which is normally held in the foremost position, may be drawn backwardly by a finger of the operator. As the trigger 22 is moved backwardly, the teeth 28 mesh with the sprocket wheel 14, and cause the shaft 11 to rotate against the tension of the spring 12. During this movement, the rack 34 engages with the gear 35 and causes the roller 40 to rotate one revolution. By continued movement backwardly of the trigger 22, the lug 33 engages with the catch 21 and causes the catch to release the cam 16, thus permitting the shutter 15 to rotate one-half revolution by means of the spring 12 until the catch 21 engages with the cam 17.

It will be observed that during this movement, the pin 30 is in the lower portion of the groove 29, and the pin 37 is in the foremost portion of the groove 36. When the trigger 22 has reached the farthest point in its movement backwardly, the spring 31 is forced outwardly, permitting the pin to pass into the upper portion of the groove 29, and the spring 38 of the rack 34 is forced outwardly, permitting the pin 37 to ride in the rearmost portion of the groove 36. By releasing the trigger 22, the spring 24 causes the trigger to move forwardly into its normal position. By this movement, the lever 27 is moved downwardly away from the sprocket wheel 14, and the rack 34 is moved forwardly away from the gear 35. As the trigger 22 reaches its foremost position, the pin 30 is forced past the spring 32, and the pin 37 is forced past the spring 38'.

It will be observed that as the shaft 39 is rotated one revolution, the gear 46 will also rotate one revolution, and in this manner, the gear 47 is moved one tooth at a time. This is the means for indicating the number of exposures which are taken.

When one roll of film has been exposed, that roll is removed and a new roll is inserted in place, and the cover 49 is again secured to the casing. At this point, the trigger is actuated seven times, and the letter S is brought into alignment with the opening 48. The letter S indicates that the operator should stop actuating the trigger. The device is now in readiness to expose the film.

The tension of the spring 12 may be increased or decreased by moving the adjusting screw 13. This is the manner in which the speed, at which the shutter 15 is actuated, is varied.

A plate which is rigidly secured to the indicating arm 7 is disposed adjacent the inner surface of the casing 1, and is adapted to move with the indicating arm for preventing any light to enter through the opening 8. Attention is drawn to the opening in the casing through which the trigger 22 is adapted to move. A spring plate 22' is secured to the inner wall of the casing at its lower end, and is adapted to cover the opening through which the trigger 22 is disposed when the trigger is in normal position.

The trigger 22 may be actuated slowly or rapidly without interfering with the operation of the device as the shutter 15 is actuated instantaneously.

I claim:

1. In a device of the type described, a casing having an opening in one end thereof and a slot in the upper edge thereof, an adjustable lens disposed in said casing in alignment with said opening and provided with an indicating arm which extends through said slot, and a plate carried by said arm and slidably disposed adjacent the slot.

2. A device of the type described comprising a casing having an opening in one end thereof, a shutter disposed in said casing in alignment with said opening, spring means for actuating said shutter, a trigger, means operatively connected to said trigger for moving said shutter against the tension of said spring means, means for holding said shutter in the moved position, and means for releasing said shutter-holding means, whereby said shutter will be automatically actuated by said spring means.

3. A device of the type described comprising a casing having an opening in one end thereof, a shutter disposed in said casing in alignment with said opening, spring means for actuating said shutter, a trigger, means operatively connected to said trigger for moving said shutter against the tension of said spring means, means for holding said shutter in the moved position, means for releasing said shutter-holding means, whereby said shutter will be automatically actuated by said spring means, a film-holding means, and means operatively connected to said trigger for moving said film before said shutter-holding means is released.

4. A device of the type described comprising a casing having an opening in one end thereof, a shutter disposed in said casing in alignment with said opening, spring means for actuating said shutter, a trigger, means operatively connected to said trigger for moving said shutter against the tension of said spring means, means for holding said shutter in the moved position, means for releasing said shutter-holding means, whereby said shutter will be automatically actuated by said spring means, a film-holding means, and means operatively connected to said trigger for moving said film before said shutter-holding means is released, said film being moved and said shutter being moved, held in moved position, and released during the movement of said trigger in one direction.

5. A device of the type described comprising a casing having an opening in one end thereof, a shutter disposed in said casing, in alignment with said opening, spring means for actuating said shutter, a trigger, a shutter-actuating lever operatively connected to said trigger, means for holding a film, a film-actuating lever operatively connected to said trigger, and film-actuating lever being arranged to move said film and said shutter-actuating lever being arranged to move said shutter during the movement of said trigger in one direction, means for holding said shutter in moved position, and means carried by said shutter-actuating lever for releasing said shutter, whereby said spring means may actuate said shutter.

6. A device of the type described comprising a casing having an opening in one end thereof, a shutter disposed in said casing in alignment with said opening, spring means for actuating said shutter, a trigger, a shutter-actuating lever operatively connected to said trigger, means for holding said shutter-actuating lever in operative engagement with said shutter during the movement of said trigger in one direction for moving said shutter and for moving said lever out of operative engagement with said shutter when said trigger is moved in the opposite direction, means for holding said shutter in moved position, and means carried by said shutter-actuating lever for releasing said shutter-holding means, whereby said spring means may actuate said shutter.

7. A device of the type described comprising a casing having an opening in one end thereof, a shutter disposed in said casing in alignment with said opening, spring means for actuating said shutter, a trigger, a shutter-actuating lever operatively connected to said trigger, means for holding said shutter-actuating lever in operative engagement with said shutter during the movement of said trigger in one direction for moving said shutter and for moving said lever out of operative engagement with said shutter when said trigger is moved in the opposite direction, means for holding said shutter in moved position, means carried by said shutter-actuating lever for releasing said shutter-holding means, whereby said spring means may actuate said shutter, a film-holding means, a film-actuating lever operatively connected to said trigger, and means for holding said film-actuating lever in operative engagement with said film holding means during the movement of said trigger in one direction and for moving said film-actuating lever away from said film-holding means when said trigger is moved in the opposite direction.

8. A device of the type described comprising a casing having an opening in one end thereof, a shutter disposed in said casing in alignment with said opening, spring means for actuating said shutter, a trigger, a shutter-actuating lever operatively connected to said trigger, means for holding said shutter-actuating lever in operative engagement with said shutter during the movement of said trigger in one direction for moving said shutter and for moving said lever out of operative engagement with said shutter when said trigger is moved in the opposite direction, means for holding said shutter in moved position, means carried by said shutter-actuating lever for releasing said shutter-holding means, whereby said spring means may actuate said shutter, a film-holding means, a film-actuating lever operatively connected to said trigger, and means for holding said film-actuating lever in operative engagement with said film-holding means during the movement of said trigger in one direction and for moving said film-actuating lever away from said film-holding means when said trigger is moved in the opposite direction, said film-actuating lever being operatively connected to said film-holding means when said shutter-actuating lever is in operative engagement with said shutter, whereby said film may be moved during the movement of said shutter into its held position and then said shutter-holding means released during one continuous movement of said trigger.

PATRICK P. GROSSO.